United States Patent
Liu

(10) Patent No.: US 11,308,798 B2
(45) Date of Patent: Apr. 19, 2022

(54) METHOD FOR REPORTING TRAFFIC EVENT, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventor: Bo Liu, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/331,838

(22) Filed: May 27, 2021

(65) Prior Publication Data
US 2021/0327262 A1 Oct. 21, 2021

(30) Foreign Application Priority Data

Jun. 3, 2020 (CN) .......................... 202010493763.X

(51) Int. Cl.
*G08G 1/01* (2006.01)
*G08G 1/052* (2006.01)
(Continued)

(52) U.S. Cl.
CPC ........... *G08G 1/0133* (2013.01); *G06V 20/46* (2022.01); *G06V 20/52* (2022.01); *G08G 1/0129* (2013.01); *G08G 1/052* (2013.01)

(58) Field of Classification Search
CPC .... G08G 1/0133; G08G 1/0129; G08G 1/052; G06K 9/00744; G06K 9/00771
See application file for complete search history.

(56) References Cited

U.S. PATENT DOCUMENTS 8,260,489 B2 * 9/2012 Nielsen ..................... B60R 1/00
701/32.2
8,340,893 B2 * 12/2012 Yamaguchi ............ G08G 1/166
701/301

(Continued)

FOREIGN PATENT DOCUMENTS

CN     103400499 A     11/2013
CN     105679042 A     6/2016
(Continued)

OTHER PUBLICATIONS

Office Action for Chinese Patent Application No. 202010493763.X, dated Mar. 25, 2021, 11 pages.
(Continued)

*Primary Examiner* — Hussein Elchanti
(74) *Attorney, Agent, or Firm* — Fay Sharpe LLP

(57) ABSTRACT

The application discloses a method and an apparatus for reporting a traffic event, an electronic device and a storage medium. The detailed implementation scheme is: obtaining a surveillance video and an object in a surveillance video; obtaining location information and/or speed information of the object; determining whether the object occurs a traffic event based on the location information and/or the speed information of the object; in response to determining that the traffic event is occurred, reporting starting information of the traffic event and generating state information of the traffic event, in which the state information of the traffic event is updated with the location information and/or the speed information of the object; supervising the state information of the traffic event; reporting ending information of the traffic event in response to determining that the traffic event ends based on the state information of the traffic event.

18 Claims, 8 Drawing Sheets

(51) Int. Cl.
*G06V 20/40* (2022.01)
*G06V 20/52* (2022.01)

(56) References Cited

U.S. PATENT DOCUMENTS

| | | | | |
|---|---|---|---|---|
| 9,975,482 | B2* | 5/2018 | Sinclair | B60R 11/04 |
| 11,159,449 | B1* | 10/2021 | Nishimura | H04L 45/22 |
| 11,210,945 | B2* | 12/2021 | Kourous-Harrigan | E01F 9/50 |
| 11,212,188 | B2* | 12/2021 | Li | H04L 41/147 |
| 2012/0277950 | A1* | 11/2012 | Plante | H04N 5/77 |
| | | | | 701/31.5 |
| 2013/0179198 | A1* | 7/2013 | Bowne | G06Q 30/0283 |
| | | | | 705/4 |
| 2013/0317711 | A1* | 11/2013 | Plante | H04N 7/188 |
| | | | | 701/51 |
| 2013/0317865 | A1* | 11/2013 | Tofte | G06Q 40/08 |
| | | | | 705/4 |
| 2013/0325324 | A1* | 12/2013 | Chen | G08G 1/096855 |
| | | | | 701/423 |
| 2014/0002651 | A1* | 1/2014 | Plante | G08G 1/20 |
| | | | | 348/148 |
| 2014/0009307 | A1* | 1/2014 | Bowers | G08G 1/161 |
| | | | | 340/901 |
| 2014/0012492 | A1* | 1/2014 | Bowers | G08G 1/16 |
| | | | | 701/301 |
| 2014/0047371 | A1* | 2/2014 | Palmer | H04N 21/8545 |
| | | | | 715/771 |
| 2015/0254781 | A1* | 9/2015 | Binion | G07C 5/12 |
| | | | | 701/32.2 |
| 2017/0025000 | A1* | 1/2017 | Lagassey | G08G 1/205 |
| 2018/0184051 | A1 | 6/2018 | Watanabe et al. | |
| 2019/0147583 | A1* | 5/2019 | Stefan | G06T 17/20 |
| | | | | 345/419 |
| 2020/0035093 | A1* | 1/2020 | Kukkadapu | G08G 1/0112 |
| 2020/0051427 | A1* | 2/2020 | Katayama | G08G 1/096741 |
| 2020/0064142 | A1* | 2/2020 | Choi | G01C 21/3415 |
| 2020/0180639 | A1* | 6/2020 | Mizoguchi | G05D 1/0214 |
| 2021/0229691 | A1* | 7/2021 | Liu | G01C 21/365 |
| 2021/0243208 | A1* | 8/2021 | Rubin | G06F 21/552 |
| 2021/0327276 | A1* | 10/2021 | Asai | B60W 50/14 |
| 2021/0341303 | A1* | 11/2021 | Rappel-Kroyzer | G06F 16/29 |
| 2021/0400062 | A1* | 12/2021 | Shtar | G06F 21/552 |
| 2021/0406303 | A1* | 12/2021 | Kim | G06F 16/687 |

FOREIGN PATENT DOCUMENTS

| | | | |
|---|---|---|---|
| CN | 107424412 A | | 12/2017 |
| CN | 109254998 A | | 1/2019 |
| CN | 109801500 A | | 5/2019 |
| CN | 109887281 A | * | 6/2019 |
| CN | 109887281 A | | 6/2019 |
| CN | 110136449 A | | 8/2019 |
| JP | 2007265322 A | | 10/2007 |

OTHER PUBLICATIONS

Extended European Search Report for Application No. 21177281.9, dated Dec. 9, 2021, 8 pages.

* cited by examiner

METHOD FOR REPORTING TRAFFIC EVENT, ELECTRONIC DEVICE AND STORAGE MEDIUM

CROSS REFERENCE TO RELATED APPLICATION

This application is based on and claims priority to Chinese patent application No. 202010493763.X, filed on Jun. 3, 2020, the entire content of which is hereby incorporated by reference into this application.

TECHNICAL FIELD

The embodiments of the present disclosure generally relate to a field of computer technologies, and particularly to a field of intelligent traffic technologies.

BACKGROUND

In intelligent traffic applications, it is usually required to detect a traffic event on a road, such as whether there are vehicles over speeding, driving in a direction not allowed by traffic regulations and occupying lanes illegally. When it is detected that there is the traffic event, the detected traffic event requires to be reported, such as to a cloud control platform.

SUMMARY

A method for reporting a traffic event, an electronic device and a storage medium are provided in the present disclosure.

According to a first aspect, a method for reporting a traffic event is provided, and includes: obtaining a surveillance video and an object in the surveillance video; obtaining location information and/or speed information of the object; determining whether the object occurs a traffic event based on the location information and/or the speed information of the object; in response to determining that the traffic event is occurred, reporting starting information of the traffic event and generating state information of the traffic event, in which, the state information of the traffic event is updated with the location information and/or the speed information of the object; supervising the state information of the traffic event; reporting ending information of the traffic event in response to determining that the traffic event ends based on the state information of the traffic event.

According to a third aspect, an electronic device is provided, and includes: at least one processor, and a memory communicating with the at least one processor, the memory stores instructions executable by the at least one processor, when the instructions are executed by the at least one processor, the at least one processor is configured to: obtain a surveillance video and obtaining an object in the surveillance video; obtain location information and/or speed information of the object; determine whether the object occurs a traffic event based on the location information and/or the speed information of the object; in response to determining that the traffic event is occurred, report starting information of the traffic event and generate state information of the traffic event, wherein, the state information of the traffic event is updated with the location information and/or the speed information of the object; and supervise the state information of the traffic event; report ending information of the traffic event in response to determining that the traffic event ends based on the state information of the traffic event.

According to a third aspect, a non-transitory computer-readable storage medium storing computer instructions is provided, in which the computer instructions are configured to cause the computer execute the method for reporting the traffic event, and the method includes: obtaining a surveillance video and an object in the surveillance video; obtaining location information and/or speed information of the object; determining whether the object occurs a traffic event based on the location information and/or the speed information of the object; in response to determining that the traffic event is occurred, reporting starting information of the traffic event and generating state information of the traffic event, wherein, the state information of the traffic event is updated with the location information and/or the speed information of the object; supervising the state information of the traffic event; and reporting ending information of the traffic event in response to determining that the traffic event ends based on the state information of the traffic event.

It should be understood that, the content described in the part is not intended to identify key or important features of embodiments of the present disclosure, nor intended to limit the scope of the present disclosure. Other features of the present disclosure will be easy to understand through the following specification.

BRIEF DESCRIPTION OF THE DRAWINGS

The accompanying drawings are used for better understanding the solution, and do not constitute a limitation to the disclosure.

DETAILED DESCRIPTION

The exemplary embodiments of the present disclosure are described as below with reference to the accompanying drawings, which include various details of embodiments of the present disclosure to facilitate understanding, and should be considered as merely exemplary. Therefore, those skilled in the art should realize that various changes and modifications may be made to the embodiments described herein without departing from the scope and spirit of the present disclosure. Similarly, for clarity and conciseness, descriptions of well-known functions and structures are omitted in the following descriptions.

A method and an apparatus for reporting a traffic event, an electronic device and a storage medium in the present disclosure are described below with reference to the accompanying drawings.

In related arts, when reporting a traffic event detecting result, a method usually adopted is to add a field into an obstacle detecting result, thus the traffic event detecting result is added into the traffic event detecting result for reporting. For example, ten vehicles are detected in a surveillance image and vehicle A is over speeding, thus a speeding field is added for the vehicle A when the obstacle detecting result is reported.

However, when a connected downstream device i.e. a receiver only requires to obtain the traffic event detecting result, the relevant obstacle detecting result reported by adopting the above reporting method may increase data receiving pressure and data parsing burden of the receiver. The above reporting method that the traffic event detecting result is added into the obstacle detecting result, requires the receiver to determine an ending time of the traffic event by itself, which increases statistics pressure of the receiver.

In view of the above problems, the present disclosure discloses a method for reporting a traffic event. When the traffic event is detected, traffic event starting information is reported, and when an end of the traffic event is monitored, traffic event ending information is reported, thereby realizing separately reporting of traffic incident information, capable of reducing the receiving pressure and the data parsing pressure of the receiver, avoiding the receiver from determining whether the traffic event ends and reducing the statistics pressure of the receiver.

Figure 1:
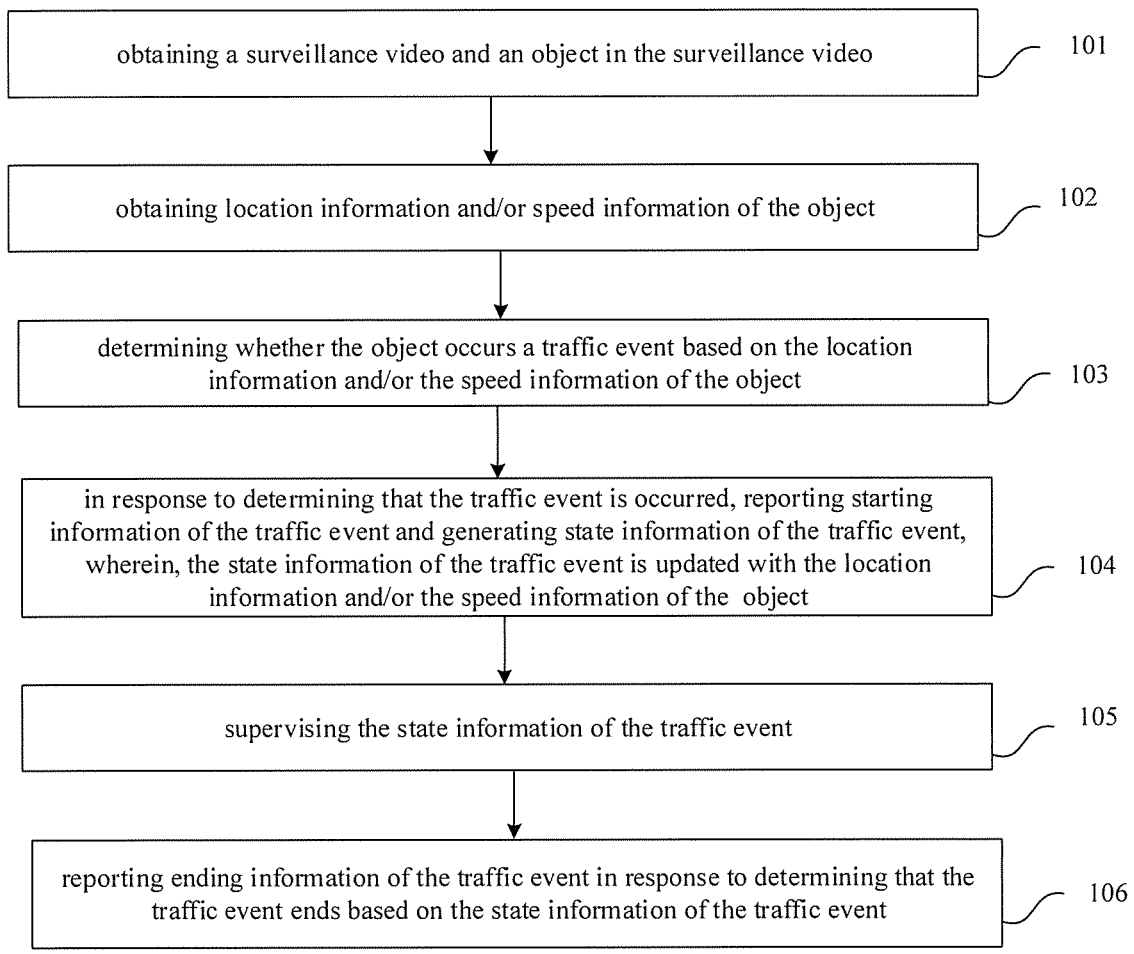
FIG. 1 is a flowchart illustrating a method for reporting a traffic event according to a first embodiment of the present disclosure.

FIG. 1 is a flowchart of a method for reporting a traffic event according to a first embodiment of the present disclosure. The method may be executed by an apparatus for reporting a traffic event provided in the present disclosure, or by an electronic device provided in the present disclosure. For example, the electronic device may be a roadside device, which is located at a roadside and is configured to detect whether a traffic event occurs in passing vehicles by analyzing a surveillance video of the passing vehicles and report the detected traffic event to implement the method for reporting the traffic event provided in the present disclosure.

The following takes an example of the method for reporting the traffic event executed by the roadside device provided in the present disclosure to explain the present disclosure.

As illustrated in FIG. 1, the method for reporting the traffic event may include the following blocks.

At block 101, a surveillance video and an object in the surveillance video are obtained.

In this embodiment, several cameras may be provided at an intersection to capture the surveillance video. For example, each camera may capture a video within a shooting angle of view in real time to obtain the surveillance video of the passing vehicles, and the surveillance video captured by the camera may be sent to the roadside device communicated with the camera. The roadside device may parse the captured surveillance video to obtain the object in the surveillance video.

The surveillance video may have at least one object. The at least one object may include vehicles and pedestrians. The vehicles may include motorized vehicles such as an automobile and a motor cycle, and non-motorized vehicles such as an electric bicycle and a bicycle.

In this embodiment, when the object in the surveillance video is obtained, an object detection algorithm may be adopted to detect the object in the surveillance video. The object detection algorithm may be a relatively mature detection algorithm at present, which will not be described in detail herein.

At block 102, location information and/or speed information of the object is obtained.

In this embodiment, after the object in the surveillance video is detected, the location information and/or the speed information of the object may be further obtained. For example, a depth estimation algorithm may be adopted to identify depth information of the object in each frame of image of the surveillance video, and then location information of the object in each frame of image are determined according to the depth information, and further speed information of the object is determined, according to the location information of the object in each frame of image, by analyzing a location change of the object and a time difference corresponding to the location change.

At block 103, whether the object occurs a traffic event is determined based on the location information and/or the speed information of the object.

In this embodiment, after the location information and/or the speed information of the object is obtained, whether the object occurs the traffic event may be determined according to the obtained location information and/or speed information of the object. For example, the traffic event includes but is not limited to over speeding, driving in a direction not allowed by traffic regulations and occupying lanes illegally, a construction area, etc.

As an example, for the over speeding event, the object is determined to occur the over speeding event in response to detecting that a speed of the object exceeds a maximum speed limit of a lane where the object is located. For the event of driving in the direction not allowed by the traffic regulations, a forward direction of the object and a lane line of the object may be determined based on the location information of the object, thus a driving direction of the lane line is obtained. It is determined whether the object drives in the direction not allowed by the traffic regulations by comparing whether the forward direction of the object is consistent with the driving direction of the lane line. For example, when the forward direction of the object determined form consecutive frames of images is inconsistent with the driving direction of the lane where the object is located, the object is determined to occur the event of driving in the direction not allowed by the traffic regulations, thereby avoiding mistakes caused by emergency avoidance and improving an accuracy of detecting the event of driving in the direction not allowed by the traffic regulations. For the event of occupying lanes illegally, it may be determined whether the object parks on a driving lane in a high-precision map and a duration for the object parking on the driving lane exceeds a preset duration according to the location information of the object, if so, the object is determined to occur the event of occupying lanes illegally. For the construction area event, an enclosed area formed by traffic cones is usually regarded as a construction area. When detecting the construction area event, it may be determined whether the detected traffic cones stably forms the enclosed area having more than a preset number (for example, 4) of traffic cones; if so, the construction area event is determined to occur.

At block 104, in response to determining that the traffic event is occurred, starting information of the traffic event is reported and state information of the traffic event is generated. The state information of the traffic event is updated with the location information and/or the speed information of the object.

In this embodiment, when it is determined that the traffic event is occurred based on the location information and/or the speed information of the object, the starting information of the traffic event is reported. The starting information of the traffic event at least includes a type of the traffic event so that an information receiver may accurately obtain the traffic event generated by object. In addition, the starting information of the traffic event may also include other information, such as starting time of the traffic event. The content contained in the starting information of the traffic event may be specifically configured according to actual requirements, which is not limited in the present disclosure.

The roadside device may generate the state information of the traffic event simultaneously when reporting the starting information of the traffic event. The state information of the traffic event is configured to record a change situation of the traffic event and is updated with the location information and/or the speed information of the object.

It is understood that, with the location information and/or the speed information of the object, the traffic event occurring on the object may also vary accordingly, so the state information of the traffic event varies accordingly. For example, when a vehicle is determined to be consecutively over speeding based on the speed information of the vehicle obtained from prior frames of images and not over speeding based on the speed information of the vehicle obtained from the current frame of image, the state information of the speeding event for the vehicle varies from consecutively over speeding to no speeding.

At block 105, the state information of the traffic event is supervised.

At block 106, ending information of the traffic event is reported in response to determining that the traffic event ends based on the state information of the traffic event.

In this embodiment, since the state information of the traffic event varies with the speed information and/or the location information of the object, the traffic event occurring on the object may be determined according to the speed information and/or location information of the object. Therefore, the state information of the traffic event may reflect the change situation of the traffic event occurring on the object. In this embodiment, with supervising the state information of the traffic event, whether the traffic event ends may be obtained accurately. When it is determined that the traffic event ends according to the state information of the traffic event, the ending information of the traffic event is reported. The ending information of the traffic event may include information such as a type and an ending time of the traffic event. The content contained in the ending information of the traffic event may be specifically configured according to actual requirements, which is not limited in the present disclosure.

In the embodiment of the present disclosure, the starting information and the ending information of the traffic event may be reported to a cloud control platform, a command center platform of a traffic management department, etc., so that a staff commands the next step of work according to the reported information. For example, when the command center platform of the traffic management department receives the over speeding event reported by the roadside device, a speeding ticket may be generated based on relevant information of the vehicle occurring the over speeding event, the starting time and ending time of the over speeding event, and the location occurring the over speeding event, so as to control traffic violations, and sent to an owner of the vehicle, so as to achieve management and control of the illegal traffic event.

According to the method for reporting the traffic event in the embodiment, the location information and/or the speed information of the object is obtained by obtaining the surveillance video and the object in the surveillance video. Whether the object occurs the traffic event is determined based on the location information and/or the speed information of the object. In response to determining to that the traffic event is occurred, the starting information of the traffic event is reported and the state information of the traffic event is generated simultaneously. The state information of the traffic event is updated with the location information and/or the speed information of the object. The state information of the traffic event is supervised and the ending information of the traffic event is reported in response to determining that the traffic event ends based on the state information of the traffic event. Thus, with reporting the starting information of the traffic event when detecting the traffic event and reporting the ending information of the traffic event when supervising the traffic event ending, thereby realizing separately reporting of the traffic event information, capable of reducing the receiving pressure and the data parsing pressure of the receiver, avoiding the receiver from determining whether the traffic event ends and reducing the statistics pressure of the receiver.

In a possible implementation according to an embodiment of the present disclosure, the starting information of the traffic event includes an identification of the traffic event, the starting time of the traffic event, the location of the traffic event and an area of the traffic event, and the ending information of the traffic event comprises the identification of the traffic event, the ending time of the traffic event, the location of the traffic event, and the area of the traffic event.

As an example, when the roadside device reports the starting information of the traffic event or the ending information of the traffic event, the following code segments may be adopted for reporting:

optional V2XType v2x_type=; //use case type
optional int32 id=; //usecase id
optional bool stop_flag=[default=false]; //whether usecase stop or not
optional double timestamp=; //timestamp
optional Point location_point=5; //usecase location
repeated Point Polygen_point=;

in which, v2x_type represents a type of the reported event (for example over speeding, or driving in the direction not allowed by the traffic regulations); id represents an id of the current event, namely the identification of the traffic event; stop_flag is set as false by default, representing the event having started, and is set as true when the event ends; timestamp represents a timestamp when the event starts or ends; location_point represents the location of the traffic event, for example a location where a vehicle occurs over speeding; Polygen_point represents the area formed by the traffic event, for example the construction area.

In the embodiment of the present disclosure, with setting the starting time of the traffic event including the identification of the traffic event, the starting time of the traffic event, the location of the traffic event and the area of the traffic event, and setting the ending time of the traffic event including the identification of the traffic event, the ending time of the traffic event, the location of the traffic event and the area of the traffic event, the receiver of the reported information may accurately obtain the relevant information and the ending time of the traffic event according to the starting time and the ending time reported, so as to avoid the receiver from determining whether the traffic event ends by itself and reduce the statistics pressure of the receiver.

In a possible implementation according to the embodiment of the present disclosure, the state information of the traffic event includes a current state identification of the traffic event and the number of consecutive frames not detecting the traffic event. Thus, on the basis of the embodiment as illustrated in FIG. 1, the method for reporting a traffic event may further include the following blocks.

At block 201, after the traffic event is occurred, the traffic event, the current state identification of the traffic event and the number of the consecutive frames not detecting the traffic event are stored in a history cache.

For example, the initial state of the history cache is empty.

In this embodiment, after determining that the object occurs the traffic event based on the location information and/or the speed information of the object, the occurred traffic event, the current state identification of the traffic event and the number of the consecutive frames not detecting the traffic event are stored in the history cache. The current state identifications may include true and false. When the current state identification is true, it indicates the object occurs the traffic event, and when the current state identification is false, it indicates that the object does not occur the traffic event.

At block 202, the current state identification is updated based on the location information and/or the speed information of the object.

At block 203, the number of the consecutive frames not detecting the traffic event is updated based on the current state identification.

Since it may be determined whether the object occurs the traffic event based on the location information and/or the speed information of the object, and the type of the traffic event may be determined. Therefore, in this embodiment, the current state identification may be updated based on the location information and/or the speed information of the object.

As a possible implementation, the location information and/or the speed information of the object in each frame may be obtained. It may be determined whether the traffic event is continuous based on the location information and/or the speed information of the object in each frame. The current state identification is kept as a first state in response to the traffic event being continuous. The current state identification is restored as a second state in response to the traffic event being non-continuous.

The first state is configured to indicate that the detected traffic event is still occurring, and may be recorded as true, and the second state is configured to indicate that the previous traffic event is not detected, and may be recorded as false.

It is understood that, the traffic event being continuous or non-continuous refers to the same traffic event occurring on the same object. For example, when one vehicle is detected to be over speeding and driving in the direction not allowed by the traffic regulations in the previous frame of image, and the same vehicle is detected to be only driving in the direction not allowed by the traffic regulations in the current frame of image, it means that the over speeding event is non-continuous and the current state identification of the over speeding event is set as the second state, and the event of driving in the direction not allowed by the traffic regulations is still continuous and the current state identification of the event of driving in the direction not allowed by the traffic regulations remains the first state.

The location information and/or the speed information of the object is obtained by analyzing each frame of image in the surveillance video, and it may be determined whether the traffic event is continuous based on the location information and/or the speed information of the object in each frame. When the traffic event is continuous, the current state identification is kept in the first state; when the traffic event is non-continuous, the current state identification is restored to the second state, which may accurately identify the change situation of the traffic event of the object, avoid omission, and provide conditions for accurately supervising and timely reporting of the traffic event.

Further, in the embodiment, the number of the consecutive frames not detecting the traffic event may be updated according to the current state identification.

As a possible implementation, the current state identification stored in the historical cache may be obtained in each frame. The number of the consecutive frames not detecting the traffic event is set as a default value in response to the current state identification being the first state, and the number of the consecutive frames not detecting the traffic event is increased by 1 in response to the current state identification being the second state. The default value may be preset, for example, the default value is set as 0.

Taking setting the default value as 0 for an example, in the embodiment, after determining whether the traffic incident is continuous according to the location information and/or the speed information of the object obtained in each frame, the current state identification of the traffic event is updated to the first state or the second state based on the determining result, and the number of the consecutive frames not detecting the traffic event is updated according to the current state identification. When the obtained current state identification is the first state, the number of the consecutive frames not detecting the traffic event is set as 0; when the obtained current state is the second state, the number of the consecutive frames not detecting the traffic event is increased by 1, so that the final number of the consecutive frames not detecting the traffic event may reflect the number of the frames not continuously detecting the traffic event occurring on the object.

The current state identification in the history cache may be obtained in each frame. The number of the consecutive frames not detecting the traffic event is set as the default value when the current state identification is the first state; and, the number of the consecutive frames not detecting the traffic event is increased by 1 when the current state identification is the second state. Therefore, the number of the consecutive frames not detecting the traffic event may be accurately obtained, misreporting ending information caused by omission may be avoided by adding the determination of the number of the consecutive frames not detecting the traffic event and robustness of reporting the event may be enhanced.

At block 204, it is determined that t the traffic event ends in response to the number of the consecutive frames not detecting the traffic event being greater than a preset threshold.

For example, the preset threshold may be preset, for example, 5, 8.

In this embodiment, for the number of the consecutive frames not detecting the traffic event after each update, the number of the consecutive frames not detecting the traffic event may be compared with the preset threshold. When the number of the consecutive frames not detecting the traffic event is greater than the preset threshold, it is determined that the traffic event ends, and then the ending information of the traffic event is reported.

According to the method for reporting the traffic event in the embodiment, after the traffic event is occurred, the traffic event, the current state identification of the traffic event and the number of consecutive frames not detecting the traffic event are stored in the history cache, the current state identification is updated based on the location information and/or the speed information of the object, and the number of the consecutive frames not detecting the traffic event is updated based on the current state identification; when the number of the consecutive frames not detecting the traffic event is greater than the preset threshold, it is determined that the traffic event ends, so as to avoid misreporting the ending information caused by omission in the supervision process, improve accuracy of reported information and improve robustness of event reporting by adding and supervising the number of the consecutive frames not detecting the traffic event.

Figure 2:
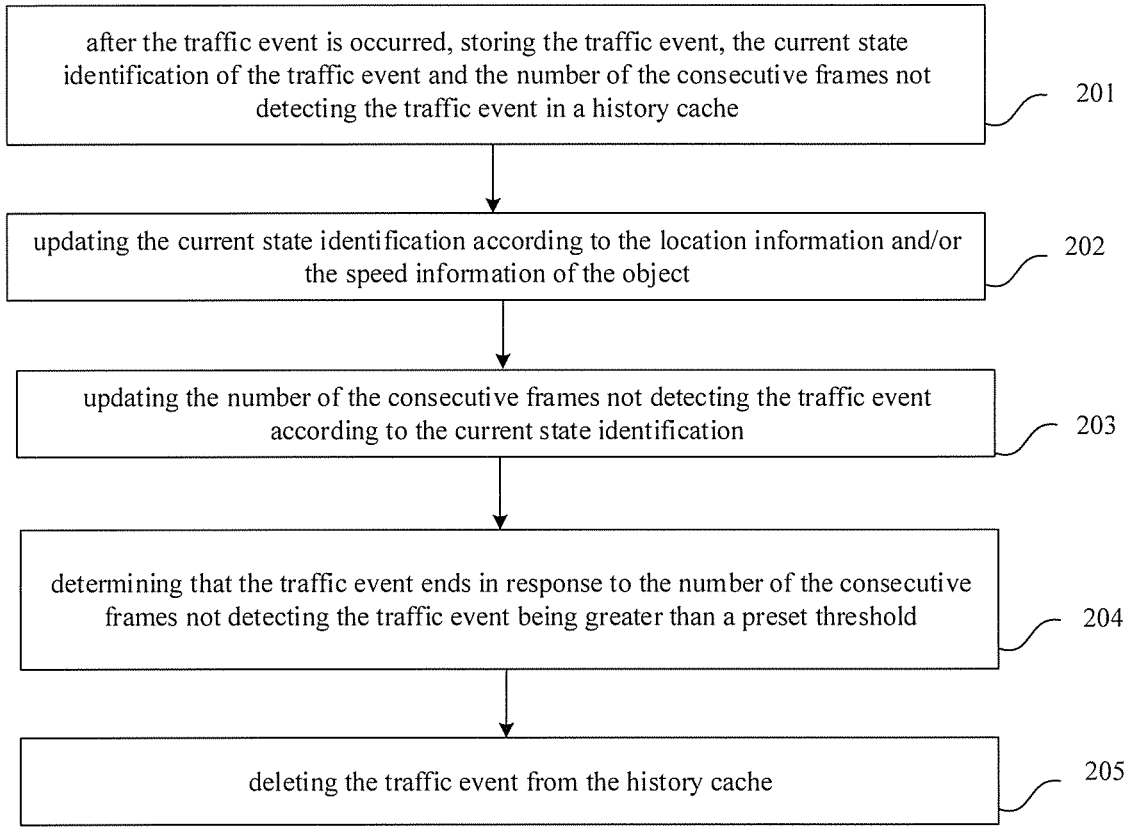
FIG. 2 is a flowchart illustrating a method for reporting a traffic event according to a second embodiment of the present disclosure.

Further, in a possible implementation in the embodiment of the present disclosure, as illustrated in FIG. 2, after determining that the traffic event ends, the method may include the following block.

At block 205, the traffic event is deleted from the history cache.

In this embodiment, in response to determining that the traffic event ends, not only the ending information of the traffic event is reported, but also the traffic event determined as end is deleted from the history cache. Therefore, memory space in the history cache may be saved to continue to store the traffic event information of the object subsequently detected. Moreover, the ended traffic event is deleted, which may avoid repeated reporting of the ended traffic event and improve the accuracy of event reporting.

The method for reporting the traffic event in the present disclosure is a common method with event-level, which may achieve independently reporting for the traffic event. An explanation is made below by taking the over speeding event as an example.

For the over speeding event, the history cache is configured to cache latest attributes of an obstacle which is over speeding. For example, the latest attributes include an ID of the obstacle, whether the current over speeding is a continuous over speeding, the number of the consecutive frames not detecting the traffic event, the latest timestamp at which the over speeding occurs, the type of the traffic event (i.e., over speeding), and the latest location where the over speeding occurs.

Initially, the history cache is empty. In a condition of detecting that one obstacle occurs stable over speeding, for example, over speeding for consecutive 5 frames, when the obstacle has existed in the history cache, the history cache is updated, the obstacle is set to be continuous over speeding in the history cache, and the number of the consecutive frames not detecting the traffic event is set as 0, and the latest location and timestamp are recorded. When the obstacle does not exist in the history cache, the over speeding event of the obstacle is added into the history cache and the over speeding event is reported. Specifically, the obstacle and the corresponding over speeding event information are added into the history cache, for example, the continuously over speeding event is set as No, and the number of the consecutive frames not detecting the traffic event is set as 0. The over speeding event is reported by a separate channel. Each obstacle in the history cache is traversed. When the continuously over speeding is true, the number of the consecutive frames not detecting the traffic event is set as 0. When the continuously over speeding is false, the number of the consecutive frames not detecting the traffic event is increased by 1. When the number of the consecutive frames not detecting the traffic event is greater than the preset threshold, it is reported that the over speeding event ends, and the over speeding event is deleted from the history cache; when the number of the consecutive frames not detecting the traffic event is less than the preset threshold, detecting the next obstacle is performed.

Generally, shooting ranges of the cameras provided at the intersections are limited. The camera at a certain intersection may only collect the surveillance video of vehicles and pedestrians that are about to pass through the intersection. After the vehicles or pedestrians leave the intersection, the vehicles and pedestrians disappear in the surveillance video. For an object that is not existed in the surveillance video, the traffic event of the object in the history cache may be deleted to save the storage space of the history cache.

A detailed description will be given below in combination with FIG. 3.

Figure 3:
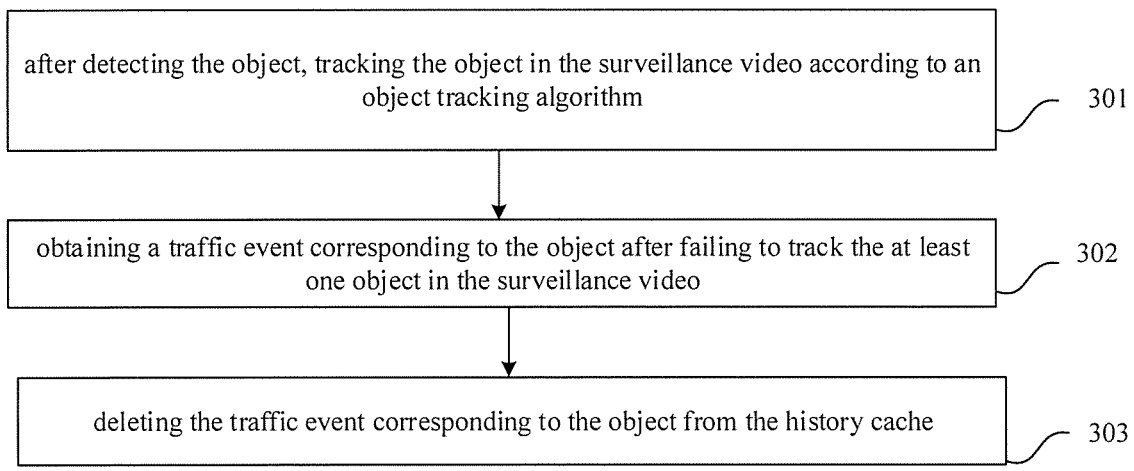
FIG. 3 is a flowchart illustrating a method for reporting a traffic event according to a third embodiment of the present disclosure.

FIG. 3 is a flowchart illustrating a method for reporting a traffic event according to a third embodiment of the present disclosure. As illustrated in FIG. 3, on the basis of the above embodiments, the method for reporting the traffic event provided in the present disclosure may further include the following blocks.

At block 301, after the object is detected, the object is tracked in the surveillance video according to an object tracking algorithm.

At block 302, the traffic event corresponding to the object is obtained after the object fails to be tracked in the surveillance video.

In this embodiment, for the obtained surveillance video, after the object is detected from the surveillance video, the object tracking algorithm may be adopted to track the object detected in the surveillance video. In two adjacent frames of images, the same object identified by the object tracking algorithm has the same id.

The object tracking algorithm may be such as a Kalman filter tracking algorithm, a particle filter tracking algorithm and other tracking algorithms, will not be limited in the present disclosure.

In a process of tracking the object in the surveillance video by adopting the object tracking algorithm, when a certain id suddenly disappears, it means that the object identified by the id disappears from the surveillance video, and the object cannot be tracked from the surveillance video, that is, the object has drove out of the surveilling range, then the traffic event corresponding to the object is further obtained.

At block 303, the traffic event corresponding to the object is deleted from the history cache.

In the embodiment, for the object that cannot be tracked in the surveillance video, the traffic event corresponding to the object is obtained and the obtained traffic event is deleted from the history cache.

For example, after one over speeding vehicle drives out of the surveillance video, the vehicle cannot be tracked by the object tracking algorithm, the traffic event corresponding to the vehicle is determined as the over speeding event and the over speeding event of the vehicle stored in the history cache is deleted.

According to the method for reporting the traffic event in the embodiment, after the object is detected, the object is tracked in the surveillance video by adopting the object tracking algorithm. When the object fails to be tracked in the surveillance video, the traffic event corresponding to the object is obtained, and the traffic event corresponding to the object is deleted from the history cache, thereby achieving to delete the traffic event corresponding to the object that is no longer surveilled and saving the memory space of the history cache.

Data interaction between the roadside devices and the receiver such as the cloud control platform and the command center platform is performed by means of remote communication, therefore, communication quality is affected by network conditions. When packet loss exists during network transmission, it may result in information reporting failure. In order to solve the issue, in a possible implementation of the embodiment of the present disclosure, an information confirming method may be adopted to confirm whether the receiver receives the reported information.

A detailed description will be given below in combination with FIG. 4.

Figure 4:
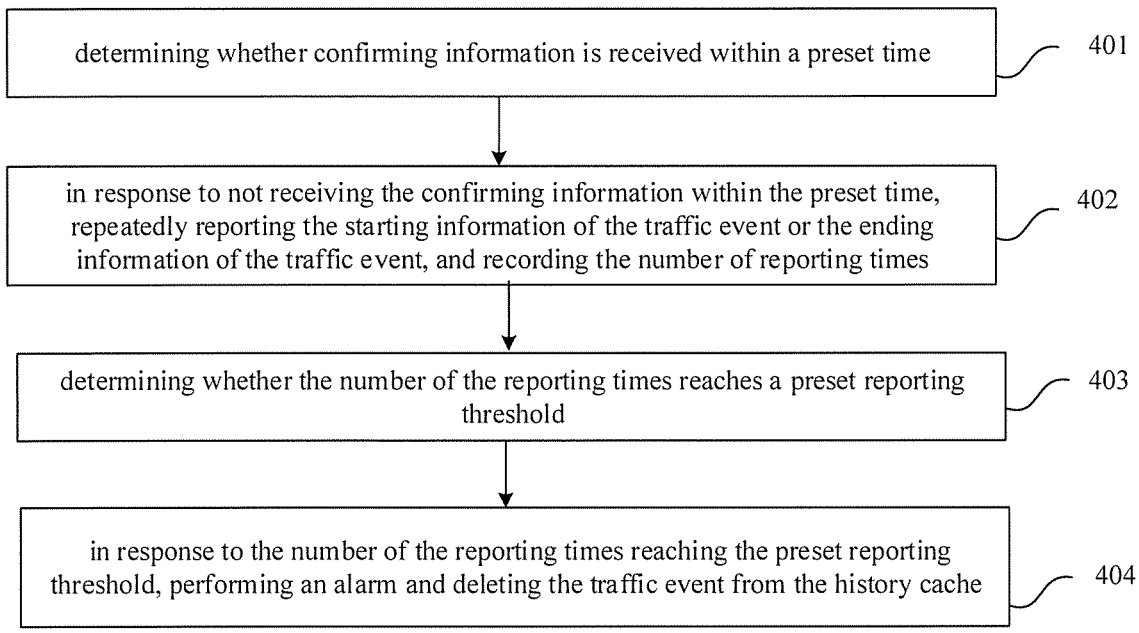
FIG. 4 is a flowchart illustrating a method for reporting a traffic event according to a fourth embodiment of the present disclosure.

FIG. 4 is a flowchart illustrating a method for reporting a traffic event according to a fourth embodiment of the present disclosure. As illustrated in FIG. 4, on the basis of the above embodiments, after reporting the starting information of the traffic event or the ending information of the traffic event, the method may further include the following blocks.

At block 401, it is determined whether confirming information is received within a preset time.

At block 402, in response to not receiving the confirming information within the preset time, the starting information of the traffic event or the ending information of the traffic event is repeatedly reported, and the number of reporting times is recorded.

At block 403, it is determined whether the number of the reporting times reaches a preset reporting threshold.

At block 404, in response to the number of the reporting times reaching the preset reporting threshold, an alarm is performed and the traffic event is deleted from the history cache.

In this embodiment, after the roadside device reports the starting information of the traffic event or the ending information of the traffic event to the receiver, the receiver may return the confirming information to the roadside device when receiving the information reported by the roadside device, and the receiver may not send the confirming information when not receiving the information reported by the roadside device. For example, the confirming information is configured to indicate that the receiver has successfully received the information reported by the roadside device. The roadside device may receive the confirming information returned by the receiver. When the confirming information is received within the preset time (such as 0.1 second, 0.5 second), the roadside device stops to report the starting information of the traffic event or the ending information of the traffic event. When the confirming information is not received within the preset time, the roadside device repeatedly reports the starting information of the traffic event or the ending information of the traffic event, records the number of the reporting times, and compares the number of the reporting times with the preset reporting threshold (for example, 3 times, 5 times). When the roadside device does not receive the confirming information until the number of the reporting times reaching the preset reporting threshold, the alarm is performed and the traffic event is deleted from the history cache.

In other words, when not receiving the confirming information within the preset time and the number of the reporting times does not reach the preset reporting threshold, the roadside device repeatedly reports the starting information of the traffic event or the ending information of the traffic event, until receiving the confirming information is or the number of the reporting times reaching the preset reporting threshold.

According to the method for reporting the traffic event in the embodiment, after the starting information of the traffic event or the ending information of the traffic event is reported, it is determined whether the confirming information is received within the preset time. When the confirming information is not received within the preset time, the starting information of the traffic event or the ending information of the traffic event is repeatedly reported, and the number of the reporting times is recorded. It is determined whether the number of the reporting times reaches the preset reporting threshold, and when the number of the reporting times reaches the preset reporting threshold, the alarm will be performed and the traffic event is deleted from the history cache, thereby achieving repeatedly reporting in response to not receiving the confirming information fed back by the receiver, being beneficial to avoiding a situation that the receiver fails to receive the reported information due to poor network conditions, improving reliability of communication data. Moreover, when the number of the reporting times reaches the preset reporting threshold, the alarm is performed, which may remind the relevant staff to perform maintenance on the roadside device in time, to restore normal operations of the roadside device as soon as possible.

Figure 5:
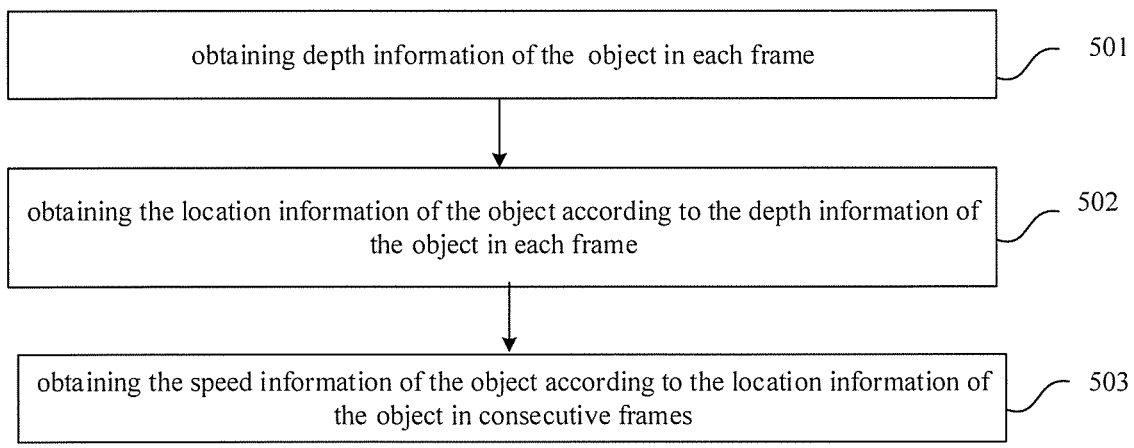
FIG. 5 is a flowchart illustrating a method for reporting a traffic event according to a fifth embodiment of the present disclosure.

In a possible implementation in the embodiment of the present disclosure, as illustrated in FIG. 5, on the basis of the above embodiment, obtaining the location information and/or the speed information of the object may include the following blocks.

At block 501, depth information of the object in each frame is obtained.

For example, the depth information of the object in each frame may be obtained by adopting a depth estimation algorithm. The depth information refers to a coordinate of each pixel included in each object in a pixel coordinate system.

At block 502, the location information of the object is obtained according to the depth information of the object in each frame.

As an example, after the depth information of the object is obtained, coordinate conversion may be performed according to internal parameters and external parameters of the camera provided at the intersection, and the coordinate of each pixel in the pixel coordinate system is projected to a world coordinate system to obtain the world coordinate corresponding to each pixel. Thus, the world coordinate of each pixel belonging to the same object may be configured as the location information of the object.

At block 503, the speed information of the object is obtained according to the location information of the object in consecutive frames.

In this embodiment, after the location information of the object is determined, the speed information of the object is obtained according to the location information of the object in the consecutive frames.

In a video, different frames of images correspond to different timestamps. A duration required by determining the change of the location information of each object may be determined according to the location information in the consecutive frames and the timestamps corresponding to the consecutive frames. The speed information of each object may be determined by dividing the amount of the change of the location information by the duration.

According to the method for reporting the traffic event in this embodiment, the depth information of the object in each frame is obtained, and the location information of the object is obtained according to the depth information of the object in each frame, and then the speed information of the object is obtained based on the location information of the object in the consecutive frames, thereby accurately identifying the speed information and the location information of the object, providing a condition for detecting the traffic event based on the speed information and the location information.

According to the embodiment of the present disclosure, an apparatus for reporting a traffic event is further provided.

Figure 6:
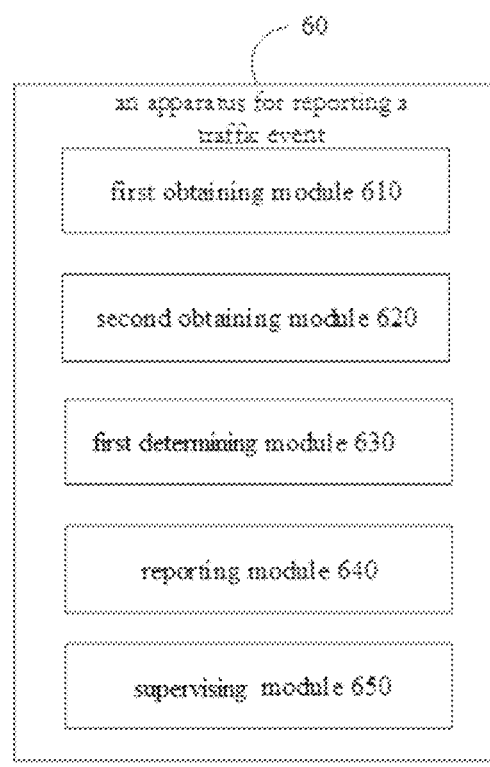
FIG. 6 is a block diagram illustrating a structure of an apparatus for reporting a traffic event according to a sixth embodiment of the present disclosure.

FIG. 6 is a schematic diagram illustrating a structure of an apparatus for reporting a traffic event according to a sixth embodiment of the present disclosure.

As illustrated in FIG. 6, an apparatus 60 for reporting the traffic event includes: a first obtaining module 610, a second obtaining module 620, a first judging module 630, a reporting module 640 and a supervising module 650.

A first obtaining module 610 is configured to obtain a surveillance video and obtain an object in the surveillance video.

A second obtaining module 620 is configured to obtain location information and/or speed information of the object.

A first determining module 630 is configured to determine whether the object occurs a traffic event based on the location information and/or the speed information of the object.

A reporting module 640 is configured to in response to determining that the traffic event is occurred, report starting information of the traffic event and generate state information of the traffic event, wherein, the state information of the traffic event is updated with the location information and/or the speed information of the object.

A supervising module 650 is configured to supervise the state information of the traffic event.

The reporting module 640 is further configured to report ending information of the traffic event in response to determining that the traffic event ends based on the state information of the traffic event.

In a possible implementation in the embodiment of the present disclosure, the starting information of the traffic event includes an identification of the traffic event, a starting time of the traffic event, a location of the traffic event and an area of the traffic event, and the ending information of the traffic event comprises the identification of the traffic event, an ending time of the traffic event, the location of the traffic event, and the area of the traffic event.

Figure 7:
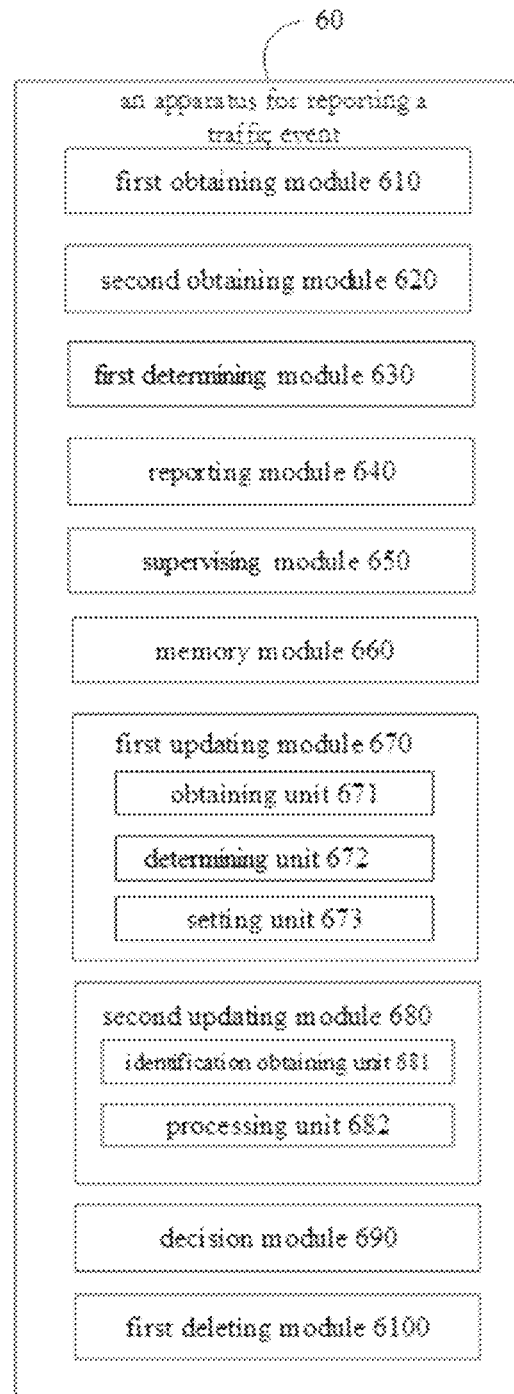
FIG. 7 is a block diagram illustrating a structure of an apparatus for reporting a traffic event according to a seventh embodiment of the present disclosure.

Further, in a possible implementation of the embodiment of the present disclosure, the state information of the traffic event comprises a current state identification of the traffic event and the number of consecutive frames not detecting the traffic event. As illustrated in FIG. 7, based on the embodiment as illustrated in FIG. 6, the apparatus 60 for reporting a traffic event further includes: a memory module 660 and a first updating module 670.

A memory module 660 is configured to, after the traffic event is occurred, store the traffic event, the current state identification of the traffic event and the number of the consecutive frames not detecting the traffic event in a history cache.

A first updating module 670 is configured to update the current state identification according to the location information and/or the speed information of the object.

In a possible implementation in the embodiment of the present disclosure, the first updating 670 includes: an obtaining unit 671, a determining unit 672 and a setting unit 673. The obtaining unit 671 is configured to obtain the location information and/or the speed information of the object in each frame. The determining unit 672 is configured to determine whether the traffic event is continuous based on the location information and/or the speed information of the object in each frame. The setting unit 673 is configured to keep the current state identification as a first state in response to the traffic event being continues, and restore the current state identification as a second state in response to the traffic event being non-continuous.

A second updating module 680 is configured to update the number of the consecutive frames not detecting the traffic event according to the current state identification.

In a possible implementation in the embodiment of the present disclosure, the second updating module 680 includes: an identification obtaining unit 681 and a processing unit 682. The identification obtaining unit 681 is configured to obtain the current state identification stored in the historical cache of each frame. The processing unit 682 is configured to set the number of the consecutive frames not detecting the traffic event as a default value in response to the current state identification being a first state, and, increase the number of the consecutive frames not detecting the traffic event by 1 in response to the current state identification being a second state.

A decision module 690 is configured to determine that the traffic event ends in response to the number of the consecutive frames not detecting the traffic event being greater than a preset threshold.

A first deleting module 6100 is configured to delete the traffic event from the history cache.

Figure 8:
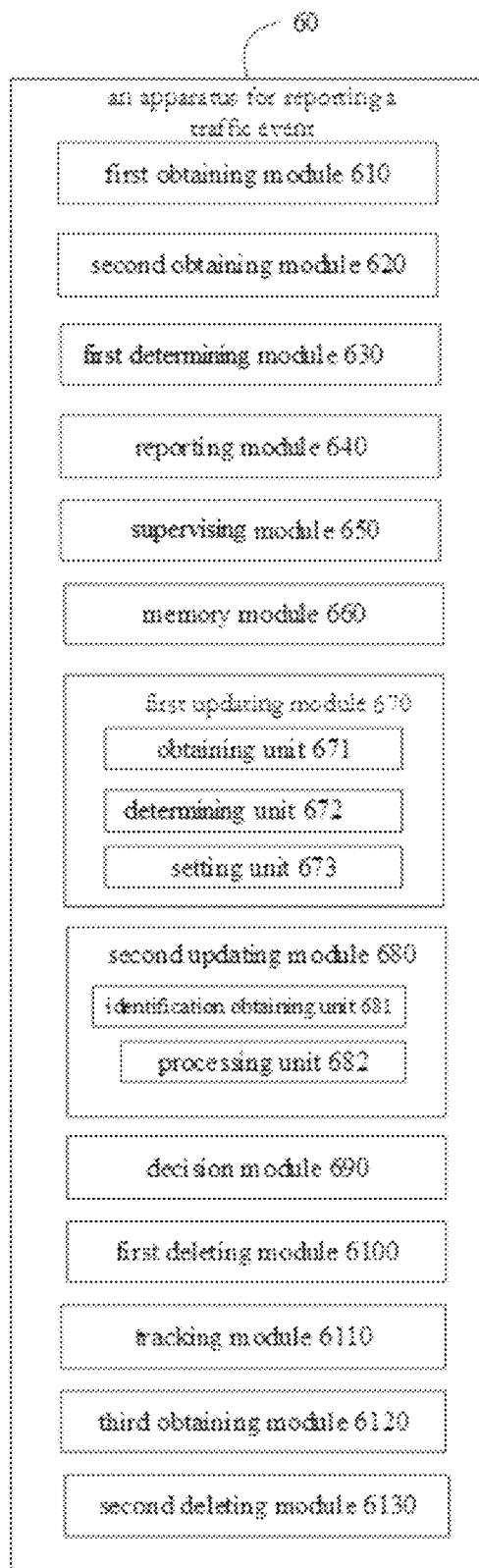
FIG. 8 is a block diagram illustrating a structure of an apparatus for reporting a traffic event according to an eighth embodiment of the present disclosure.

Further, in a possible implementation of the embodiment of the present disclosure, as shown in FIG. 8, based on the embodiment as shown in FIG. 7, the apparatus 60 for reporting the traffic event further includes: a tracking module 6110, a third obtaining module 6120 and a second deleting module 6130. The tracking module 6110 is configured to, after detecting the object, track the object in the surveillance video according to an object tracking algorithm. The third obtaining module 6120 is configured to obtain a traffic event corresponding to the object after failing to track the object in the surveillance video. The second deleting module 6130 is configured to delete the traffic event corresponding to the object from the history cache.

Figure 9:
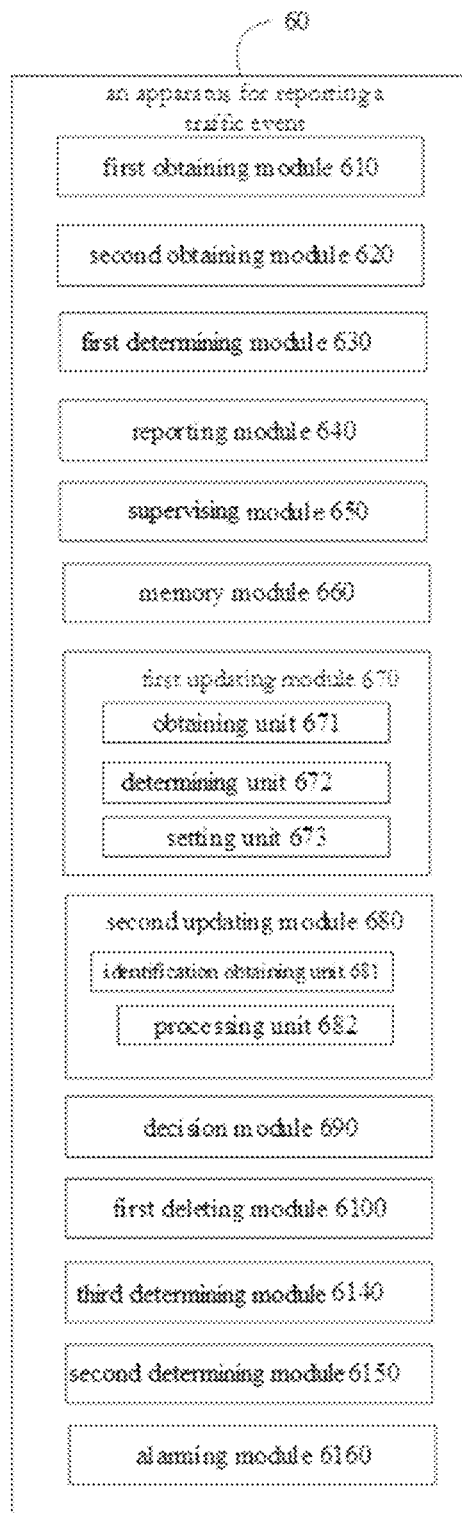
FIG. 9 is a block diagram illustrating a structure of an apparatus for reporting a traffic event according to a ninth embodiment of the present disclosure.

In a possible implementation of the embodiment of the present disclosure, as shown in FIG. 9, based on the embodiment as shown in FIG. 7, the apparatus 60 for reporting the traffic event further includes: a third determining module 6140, a second determining module 6150 and an alarming module 6160. The third determining module 6140 is configured to determine whether confirming information is received within a preset time. The reporting module 640 is further configured to, in response to not receiving the confirming information within the preset time, repeatedly report the starting information of the traffic event or the ending information of the traffic event, and record the number of reporting times. The second determining module 6150 is configured to determine whether the number of the reporting times reaches a preset time threshold. The alarming module 6160 is configured to in response to the number of the reporting times reaching the preset reporting threshold, perform an alarm and delete the traffic event from the history cache.

Figure 10:
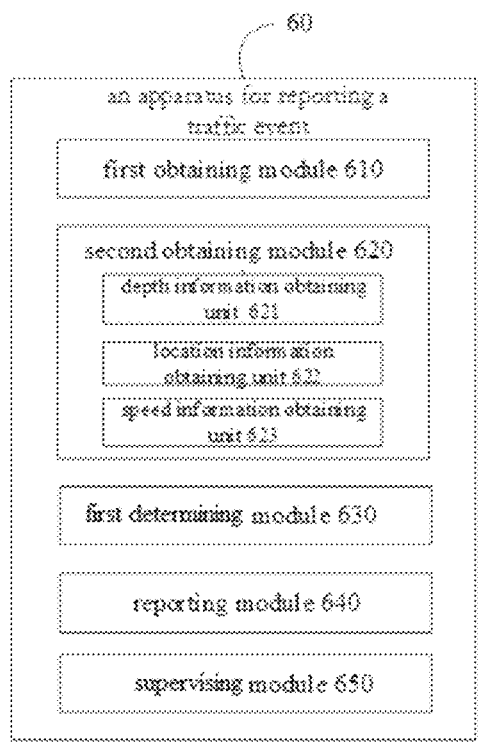
FIG. 10 is a block diagram illustrating a structure of an apparatus for reporting a traffic event according to a tenth embodiment of the present disclosure.

In a possible implementation of the embodiment of the present disclosure, as shown in FIG. 10, based on the embodiment as shown in FIG. 6, the second obtaining module 620 includes: a depth information obtaining unit 621, a location information obtaining unit 622 and a speed information obtaining unit 623. The depth information obtaining unit 621 is configured to obtain depth information of the object in each frame. The location information obtaining unit 622 is configured to obtain the location information of the object according to the depth information of the object in each frame. The speed information obtaining unit 623 is configured to obtain the speed information of the object according to the location information of the object in consecutive frames.

It needs to be noted that the foregoing explanation of the embodiment of the method for reporting the traffic event also applies to the apparatus for reporting the traffic event in this embodiment, of which the implementation principle is similar, which will not be repeated here.

According to the apparatus for reporting the traffic event in the embodiment, the location information and/or the speed information of the object is obtained by obtaining the surveillance video and the object in the surveillance video. Whether the object occurs the traffic event is determined based on the location information and/or the speed information of the object. In response to determining to that the traffic event is occurred, the starting information of the traffic event is reported and the state information of the traffic event is generated simultaneously. The state information of the traffic event is updated with the location information and/or the speed information of the object. The state information of the traffic event is supervised and the ending information of the traffic event is reported in response to determining that the traffic event ends based on the state information of the traffic event. Thus, with reporting the starting information of the traffic event when detecting the traffic event and reporting the ending information of the traffic event when supervising the traffic event ending, thereby realizing separately reporting of the traffic event information, capable of reducing the receiving pressure and the data parsing pressure of the receiver, avoiding the receiver from determining whether the traffic event ends and reducing the statistics pressure of the receiver.

An electronic device and a readable storage medium are further provided according to embodiments of the present disclosure.

Figure 11:
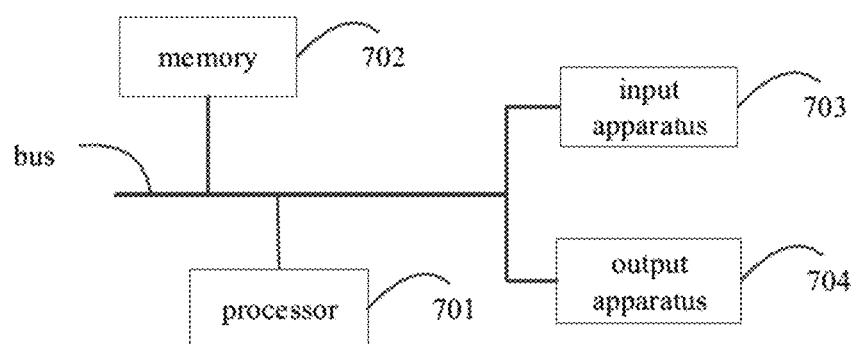
FIG. 11 is a block diagram illustrating an electronic device configured to implement a method for reporting a traffic event in embodiments of the present disclosure.

FIG. 11 is a block diagram illustrating an electronic device configured to implement the method for reporting the traffic event in embodiments of the present disclosure. The electronic device is intended to represent various types of digital computers, such as laptop computers, desktop computers, workstations, personal digital assistants, servers, blade servers, mainframe computers, and other suitable computers. An electronic device may also represent various types of mobile apparatuses, such as personal digital assistants, cellular phones, smart phones, wearable devices, and other similar computing devices. The components shown herein, their connections and relations, and their functions are merely examples, and are not intended to limit the implementation of the disclosure described and/or required herein.

As shown in FIG. 11, the electronic device includes: one or more processors 701, a memory 702, and an interface configured to connect various components, including a high-speed interface and a low-speed interface. The various components are connected to each other with different buses, and may be installed on a public main board or installed in other ways as needed. The processor may process instructions executed in the electronic device, including instructions stored in or on the memory to display graphical information of the GUI on an external input/output device (such as a display device coupled to an interface). In other implementation, multiple processors and/or multiple buses may be configured with multiple memories if necessary. Similarly, the processor may connect multiple electronic devices, and each device provides a part of necessary operations (for example, as a server array, a group of blade servers, or a multi-processor system). FIG. 11 takes one processor 701 as an example.

A memory 702 is a non-transitory computer-readable storage medium provided in the present disclosure. The memory stores instructions executable by the at least one processor, so that the at least one processor executes a method for reporting a traffic event as described in the present disclosure. The non-transitory computer-readable storage medium of the present disclosure stores computer instructions, in which the computer instructions are configured so that a computer executes a method for reporting a traffic event provided in the present disclosure.

As a non-transitory computer-readable storage medium, the memory 702 may be configured to store non-transitory software programs, non-transitory computer-executable programs and modules, such as program instructions/modules corresponding to a method for reporting a traffic event in the embodiment of the present disclosure (for example, a first obtaining module 610, a second obtaining module 620, a first judging module 630, a reporting module 640 and a supervisory module 650 as shown in FIG. 6). The processor 701 executes various functional applications and data processing of the server by running a non-transitory software program, an instruction, and a module stored in the memory 702, that is, a method for reporting a traffic event in the above method embodiment is implemented.

The memory 702 may include a program storage area and a data storage area; the program storage area may store operation systems and application programs required by at least one function; the data storage area may store data created based on the use of an electronic device configured to execute a method for reporting a traffic event, etc. In addition, the memory 702 may include a high-speed random access memory, and may also include a non-transitory memory, such as at least one magnetic disk storage device, a flash memory device, or other non-transitory solid-state storage devices. In some embodiments, the memory 702 optionally includes a memory set remotely relative to the processor 701 that may be connected to an electronic device configured to execute a method for reporting a traffic event via a network connection. The example of the above networks includes but not limited to an Internet, an enterprise intranet, a local area network, a mobile communication network and their combination.

The electronic device configured to execute the method for reporting the traffic event may further include: an input apparatus 703 and an output apparatus 704. The processor 701, the memory 702, the input apparatus 703, and the output apparatus 704 may be connected through a bus or in other ways. FIG. 11 takes connection through a bus as an example.

The input apparatus 703 may receive input digital or character information, and generate key signal input related to user setting and function control of an electronic device configured to execute a method for reporting a traffic event, such as a touch screen, a keypad, a mouse, a track pad, a touch pad, an indicating rod, one or more mouse buttons, a trackball, a joystick and other input apparatuses. The output apparatus 704 may include a display device, an auxiliary lighting apparatus (for example, a LED) and a tactile feedback apparatus (for example, a vibration motor), etc. The display device may include but not limited to a liquid crystal display (LCD), a light emitting diode (LED) display and a plasma display. In some implementations, a display device may be a touch screen.

Various implementation modes of the systems and technologies described herein may be implemented in a digital electronic circuit system, an integrated circuit system, a dedicated ASIC (application specific integrated circuit), a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

The computer programs (also called as programs, softwares, software applications, or codes) include machine instructions of a programmable processor, and may be implemented with high-level procedure and/or object-oriented programming languages, and/or assembly/machine languages. As used herein, the terms "a machine-readable medium" and "a computer-readable medium" refer to any computer program product, device, and/or apparatus configured to provide machine instructions and/or data for a programmable processor (for example, a magnetic disk, an optical disk, a memory, a programmable logic device (PLD)), including a machine-readable medium that receive machine instructions as machine-readable signals. The term "a machine-readable signal" refers to any signal configured to provide machine instructions and/or data for a programmable processor.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user, for example, the feedback provided to the user may be any form of sensory feedback (for example, visual feedback, auditory feedback, or tactile feedback); and input from the user may be received in any form (including an acoustic input, a voice input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), a blockchain network, and an internet.

The computer system may include a client and a server. The client and server are generally far away from each other and generally interact with each other through a communication network. The relation between the client and the server is generated by computer programs that run on the corresponding computer and have a client-server relationship with each other.

In the technical solution of the embodiment of the present disclosure, the traffic event information may be separately reported by reporting the starting information of the traffic event when detecting the traffic event and the ending information of the traffic event may be reported when supervising the end of the traffic event, thereby reducing the receiving pressure and the data parsing pressure of the receiver, avoiding the receiver from determining whether the traffic event ends and reducing the statistics pressure of the receiver.

It should be understood that, various forms of procedures shown above may be configured to reorder, add or delete blocks.

For example, blocks described in the present disclosure may be executed in parallel, sequentially, or in a different order, as long as the desired result of the technical solution disclosed in the present disclosure may be achieved, which will not be limited herein.

The above specific implementations do not constitute a limitation on the protection scope of the present disclosure. Those skilled in the art should understand that various modifications, combinations, sub-combinations and substitutions may be made according to design requirements and other factors. Any modification, equivalent replacement, improvement, etc., made within the spirit and principle of embodiments of the present disclosure shall be included within the protection scope of embodiments of the present disclosure.

What is claimed is:

1. A method for reporting a traffic event, implemented by an electronic device, and comprising:
    obtaining a surveillance video captured by a camera and an object in the surveillance video;
    obtaining location information and/or speed information of the object;
    in response to determining that the traffic event has occurred based on the location information and/or the speed information of the object, reporting starting information of the traffic event and generating state information of the traffic event to a cloud platform, wherein, the state information of the traffic event is updated with the location information and/or the speed information of the object;
    supervising the state information of the traffic event; and
    reporting ending information of the traffic event to the cloud platform in response to determining that the traffic event ends based on the state information of the traffic event;
    wherein the state information of the traffic event comprises a current state identification of the traffic event and the number of consecutive frames not detecting the traffic event, and wherein the method further comprises:

after the traffic event is occurred, storing the traffic event, the current state identification of the traffic event and the number of the consecutive frames not detecting the traffic event in a history cache;
updating the current state identification according to the location information and/or the speed information of the object;
updating the number of the consecutive frames not detecting the traffic event according to the current state identification; and
determining that the traffic event ends in response to the number of the consecutive frames not detecting the traffic event being greater than a preset threshold.

2. The method according to claim 1, after determining that the traffic event ends, further comprising:
deleting the traffic event from the history cache.

3. The method according to claim 1, wherein updating the current state identification according to the location information and/or the speed information of the object, comprises:
obtaining the location information and/or the speed information of the object in each frame;
determining whether the traffic event is continuous based on the location information and/or the speed information of the object in each frame;
keeping the current state identification as a first state in response to the traffic event being continues; and
restoring the current state identification as a second state in response to the traffic event being non-continuous.

4. The method according to claim 3, wherein updating the number of the consecutive frames not detecting the traffic event according to the current state identification, comprises:
obtaining the current state identification stored in the historical cache of each frame;
setting the number of the consecutive frames not detecting the traffic event as a default value in response to the current state identification being the first state; and
increasing the number of the consecutive frames not detecting the traffic event by 1 in response to the current state identification being the second state.

5. The method according to claim 1, further comprising:
after detecting the object, tracking the object in the surveillance video according to an object tracking algorithm;
obtaining a traffic event corresponding to the object after failing to track the object in the surveillance video; and
deleting the traffic event corresponding to the object from the history cache.

6. The method according to claim 1, after reporting starting information of the traffic event or ending information of the traffic event, further comprising:
determining whether confirming information is received within a preset time; and
in response to not receiving the confirming information within the preset time, repeatedly reporting the starting information of the traffic event or the ending information of the traffic event, and recording the number of reporting times.

7. The method according to claim 6, further comprising:
determining whether the number of the reporting times reaches a preset reporting threshold; and
in response to the number of the reporting times reaching the preset reporting threshold, performing an alarm and deleting the traffic event from the history cache.

8. The method according to claim 1, wherein the starting information of the traffic event comprises an identification of the traffic event, a starting time of the traffic event, a location of the traffic event and an area of the traffic event, and the ending information of the traffic event comprises the identification of the traffic event, an ending time of the traffic event, the location of the traffic event, and the area of the traffic event.

9. The method according to claim 1, wherein obtaining the location information and/or the speed information of the object, comprises:
obtaining depth information of the object in each frame;
obtaining the location information of the object according to the depth information of the object in each frame; and
obtaining the speed information of the object according to the location information of the object in consecutive frames.

10. An electronic device, comprising:
at least one processor; and
a memory communicating with the at least one processor; wherein,
the memory stores instructions executable by the at least one processor, when the instructions are executed by the at least one processor, the at least one processor is configured to:
obtain a surveillance video captured by a camera and obtaining an object in the surveillance video;
obtain location information and/or speed information of the object;
in response to determining that the traffic event has occurred based on the location information and/or the speed information of the object, report starting information of the traffic event and generate state information of the traffic event to a cloud platform, wherein the state information of the traffic event is updated with the location information and/or the speed information of the object; and
supervise the state information of the traffic event;
report ending information of the traffic event to the cloud platform in response to determining that the traffic event ends based on the state information of the traffic event;
wherein the at least one processor is configured to:
after the traffic event is occurred, store the traffic event, the current state identification of the traffic event and the number of the consecutive frames not detecting the traffic event in a history cache;
update the current state identification according to the location information and/or the speed information of the object;
update the number of the consecutive frames not detecting the traffic event according to the current state identification; and
determine that the traffic event ends in response to the number of the consecutive frames not detecting the traffic event being greater than a preset threshold.

11. The electronic device according to claim 10, wherein the at least one processor is configured to:
delete the traffic event from the history cache.

12. The apparatus according to claim 10, wherein the at least one processor is configured to:
obtain the location information and/or the speed information of the object in each frame;
determine whether the traffic event is continuous based on the location information and/or the speed information of the object in each frame; and
keep the current state identification as a first state in response to the traffic event being continues, and restore the current state identification as a second state in response to the traffic event being non-continuous.

13. The electronic device according to claim 12, wherein the at least one processor is configured to:
   obtain the current state identification stored in the historical cache of each frame; and
   set the number of the consecutive frames not detecting the traffic event as a default value in response to the current state identification being a first state, and, increase the number of the consecutive frames not detecting the traffic event by 1 in response to the current state identification being a second state.

14. The electronic device for reporting a traffic event according to claim 10, wherein the at least one processor is configured to:
   after detecting the object, track the object in the surveillance video according to an object tracking algorithm;
   obtain a traffic event corresponding to the object after failing to track the object in the surveillance video; and
   delete the traffic event corresponding to the object from the history cache.

15. The electronic device according to claim 10, wherein the at least one processor is configured to:
   determine whether confirming information is received within a preset time;
   in response to not receiving the confirming information within the preset time, repeatedly report the starting information of the traffic event or the ending information of the traffic event, and record the number of reporting times.

16. The electronic device according to claim 15, wherein the at least one processor is configured to:
   determine whether the number of the reporting times reaches a preset time threshold; and
   in response to the number of the reporting times reaching the preset reporting threshold, perform an alarm and delete the traffic event from the history cache.

17. The electronic device according to claim 10, wherein the starting information of the traffic event comprises an identification of the traffic event, a starting time of the traffic event, a location of the traffic event and an area of the traffic event, and the ending information of the traffic event comprises the identification of the traffic event, an ending time of the traffic event, the location of the traffic event, and the area of the traffic event.

18. A non-transitory computer-readable storage medium storing computer instructions, wherein the computer instructions are configured to cause the computer execute a method for reporting a traffic event, and the method comprises:
   obtaining a surveillance video captured by a camera and an object in the surveillance video;
   obtaining location information and/or speed information of the object;
   in response to determining that the traffic event has occurred based on the location information and/or the speed information of the object, reporting starting information of the traffic event and generating state information of the traffic event to a cloud platform, wherein the state information of the traffic event is updated with the location information and/or the speed information of the object;
   supervising the state information of the traffic event; and
   reporting ending information of the traffic event to the cloud platform in response to determining that the traffic event ends based on the state information of the traffic event;
   wherein the state information of the traffic event comprises a current state identification of the traffic event and the number of consecutive frames not detecting the traffic event, the method further comprises:
   after the traffic event is occurred, storing the traffic event, the current state identification of the traffic event and the number of the consecutive frames not detecting the traffic event in a history cache;
   updating the current state identification according to the location information and/or the speed information of the object;
   updating the number of the consecutive frames not detecting the traffic event according to the current state identification; and
   determining that the traffic event ends in response to the number of the consecutive frames not detecting the traffic event being greater than a preset threshold.

* * * * *